(12) United States Patent
Chen

(10) Patent No.: US 6,816,713 B2
(45) Date of Patent: Nov. 9, 2004

(54) SWITCHING AND RETAINING DEVICE FOR USE IN CELLULAR PHONES AND PERIPHERAL COMMUNICATION EQUIPMENT THEREOF

(75) Inventor: Tonny Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 503 days.

(21) Appl. No.: 09/824,819

(22) Filed: Apr. 4, 2001

(65) Prior Publication Data

US 2002/0147034 A1 Oct. 10, 2002

(51) Int. Cl.[7] .............................................. H04Q 7/32
(52) U.S. Cl. ................ 455/90.3; 455/569.1; 455/575.1; 379/445; 379/446; 379/455
(58) Field of Search ........................... 455/569.1, 575.1, 455/573, 90.3; 379/445, 446, 455, 454; 224/570, 552, 553; 248/221.11

(56) References Cited

U.S. PATENT DOCUMENTS 5,305,381 A * 4/1994 Wang et al. ................ 379/455
6,341,218 B1 * 1/2002 Poplawsky et al. ....... 455/569.1
6,714,767 B2 * 3/2004 Fan ........................... 455/90.3

* cited by examiner

Primary Examiner—Nay Maung
Assistant Examiner—Raymond S Dean
(74) Attorney, Agent, or Firm—Rosenberg, Klein & Lee

(57) ABSTRACT

A switching and retaining device applied to cellular phones and their peripheral communication equipment is provided. More particularly, it relates to a switching and retaining device that is coupled to a cellular phone and its peripheral equipment and can carry out telecommunication automatically between the cellular phone and its peripheral equipment. It is made up of a base mount with a retaining mount secured thereto and having a holding arm controlled to slidably extend and retract by way of a control unit. There is an input terminal, an output terminal and a power terminal that are placed on the base mount and are coupled to the peripheral equipment of a cellular phone and a power source by conduction wires. On the retaining mount is disposed a receiving cavity for accommodation of a cellular phone.

4 Claims, 11 Drawing Sheets

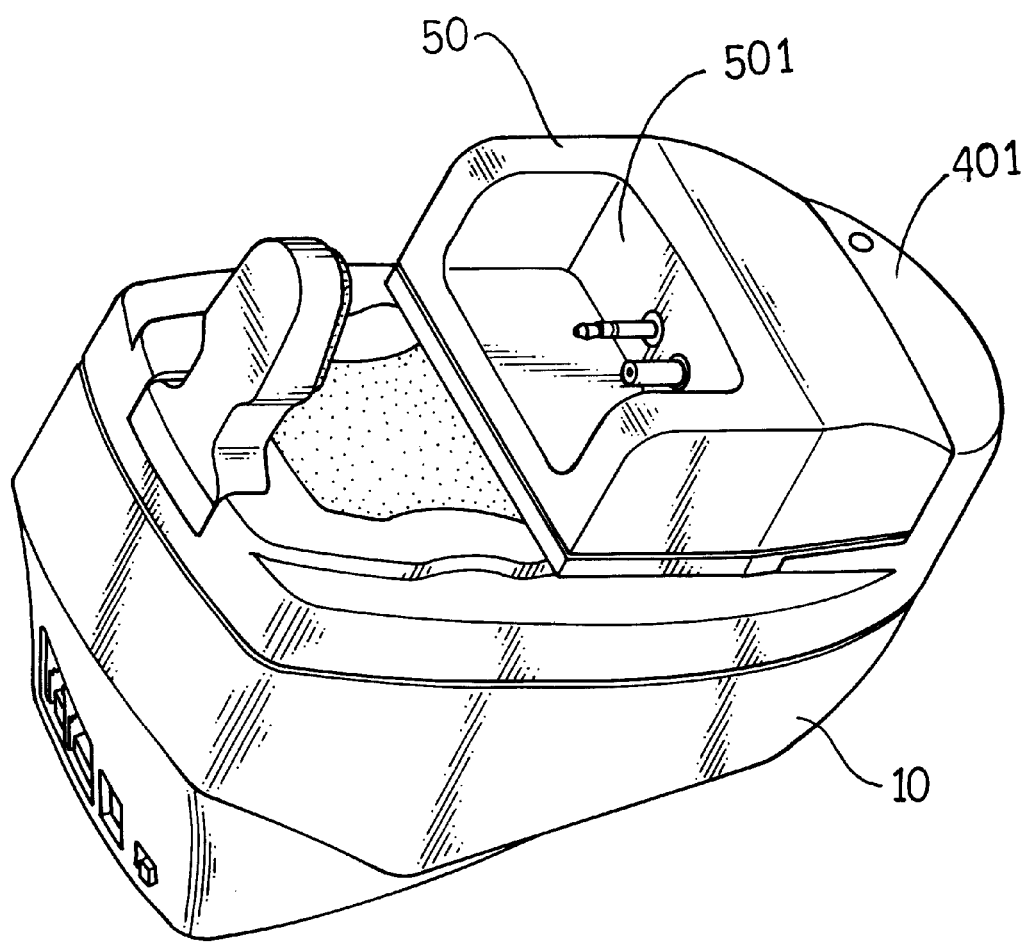
F I G. 8

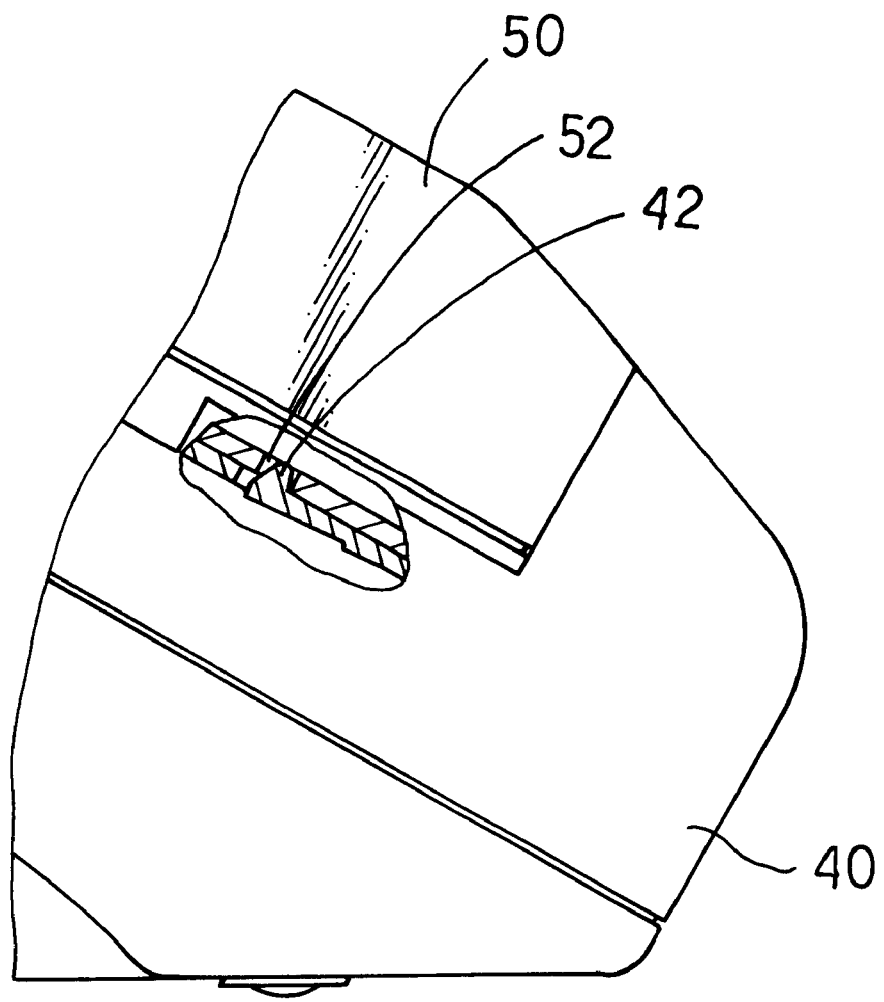
F I G. 9

SWITCHING AND RETAINING DEVICE FOR USE IN CELLULAR PHONES AND PERIPHERAL COMMUNICATION EQUIPMENT THEREOF

BACKGROUND OF THE INVENTION

The present invention relates to a switching and retaining device applied to cellular phones and their peripheral communication equipment and more particularly relates to a switching and retaining device that is coupled to a cellular phone and its peripheral equipment and can carry out telecommunication automatically between the cellular phone and its peripheral equipment. The present invention is basically made up of a base mount with a retaining mount secured thereto. The retaining mount is equipped with a holding arm that is controlled to slidably extend and retract by way of a control unit. Inside the base mount is disposed a circuit set; and an input terminal, an output terminal and a power terminal are placed on the base mount and are coupled to the peripheral equipment of a cellular phone and a power source by conduction wires. On the retaining mount is disposed a receiving cavity for accommodation of a cellular phone with a signal plug and power socket positioned thereon for connection to the cellular phone and its peripheral equipment. Those plug and socket are connected to the circuit set of the base mount. A control button is disposed on the retaining mount to control the extension and retraction of the holding arm. Thereby, a cellular phone can be readily housed in the receiving cavity of the retaining mount and incoming calls of the cellular phone can be switched automatically to its peripheral equipment, protecting people from long time exposure to electromagnetic wave of a cellular phone when a person is inside a room.

Cellular phone has become an indispensable communication tool to most people living in modern cities. However, electromagnetic waves generated by cellular phones have bad effect on people's health. It makes users of cellular phones worried when they enjoy the facilities of cellular phones every moment. People are used to keeping their cellular phones in a stand-by mode even when they are at home or in office or in a vehicle so that they will not miss any important phone calls. In that case, people are reluctantly forced to use cellular phones in a long period of time everyday. It may be detrimental to people's health.

To solve such a problem, the present inventor comes up with a switching and retaining device for cellular phones and their peripheral communication equipment. Such a switching and retaining device can carry out telecommunication automatically between the cellular phone and its peripheral equipment when incoming calls of a cellular phone positioned in a receiving cavity of the mount are transmitted to the cellular phone. Thereby people can be better protected from close exposure to electromagnetic waves of cellular phones constantly.

SUMMARY OF THE INVENTION

Therefore, the primary object of the present invention is to provide a switching and retaining device which is mainly used to hold a cellular phone in place and automatically switches incoming calls to the peripheral equipment of the cellular phone when a user of the cellular phone stays inside a room or in a vehicle.

BRIEF DESCRIPTION OF THE DRAWINGS

FIG. 6A is a diagram showing another operation mode of the button in FIG. 6;

FIG. 8 is a diagram showing the assembly of the second embodiment;

FIG. 9 is a partially sectional diagram showing the detailed structure of the first embodiment of the present invention;

DETAILED DESCRIPTION OF THE PREFERRED EMBODIMENTS

Figure 1:
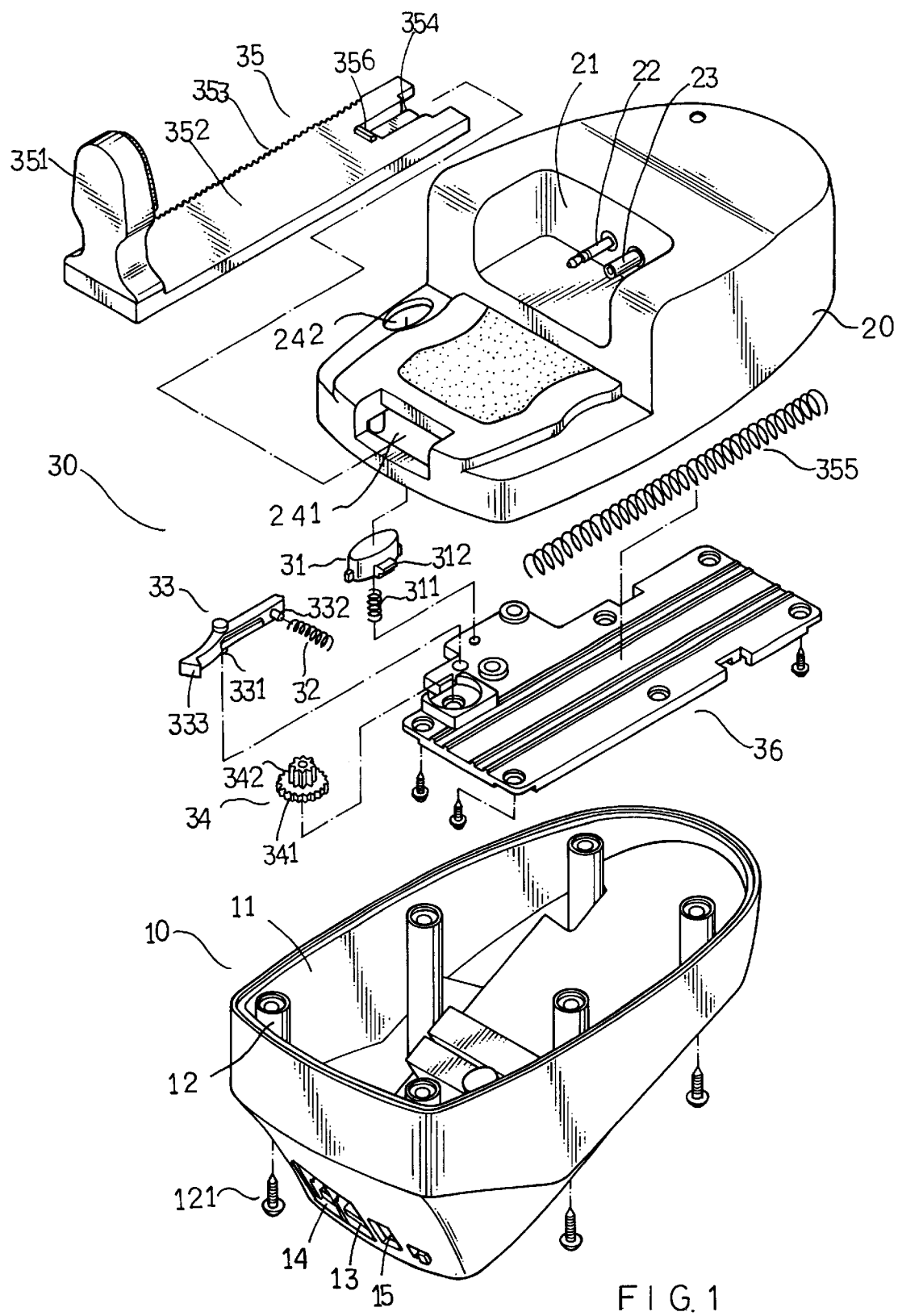
FIG. 1 is a perspective diagram showing the exploded components of the present invention.
Figure 2:
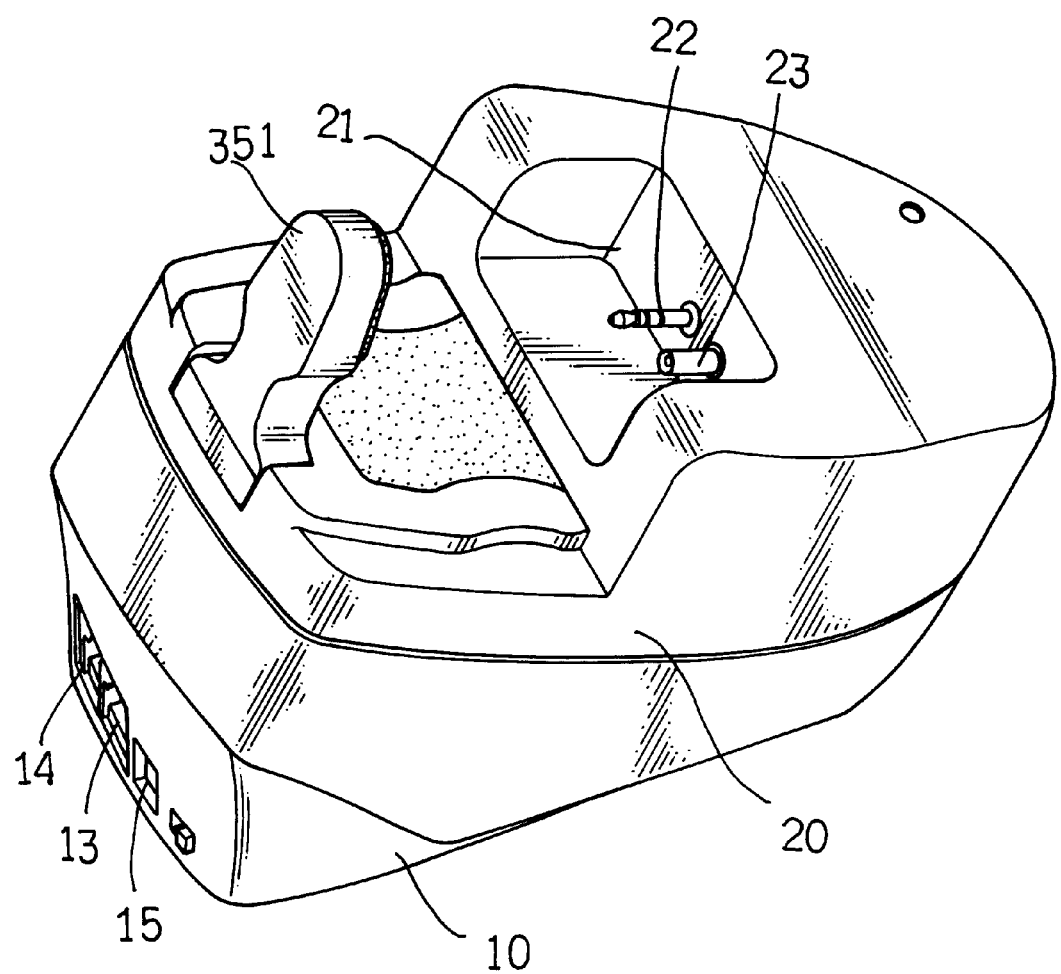
FIG. 2 is a perspective diagram showing the assembly of the switching and retaining mount of the present invention.
Figure 3:
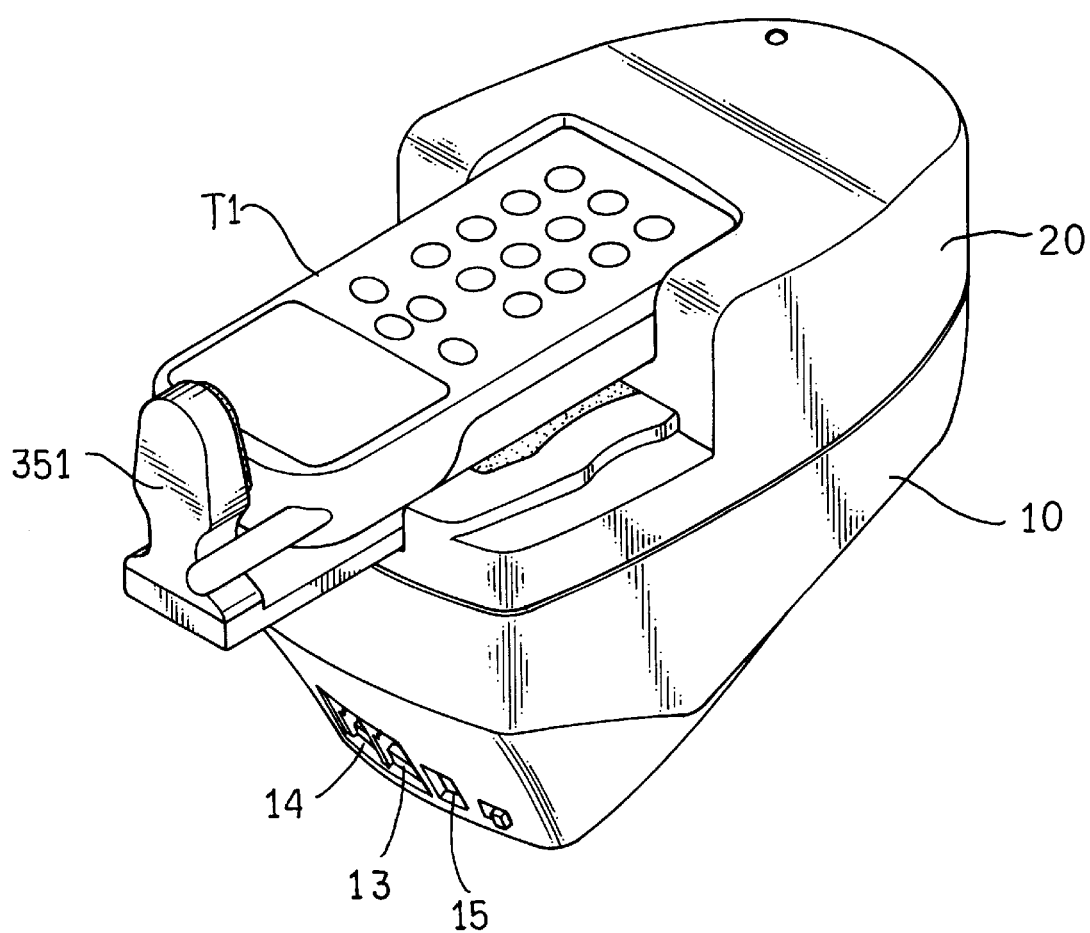
FIG. 3 is a diagram showing the placement of a cellular phone on the mount in practical application.

Referring to the drawings ranging from FIG. 1 to FIG. 6, the present invention relating to a switching and retaining device for use in a cellular phone and its peripheral equipment is mainly made up of a base mount 10, a retaining mount 20 disposed above the base mount 10, a holding arm 35 disposed on the retaining mount and controlled by the control unit 30.

The base mount 10 is provided with a slantly extended receiving cavity 11 for housing an electric circuit which is not shown and described in details because it is a commonly seen circuit with a charging circuitry or a hand-free device circuitry. In the receiving cavity 11 are disposed a plurality of tubular positioning rods 12 so as to permit the base mount 10 to be locked into engagement with the retaining mount 20 in assembly by way of screws 121. On the base mount 10 are disposed, a power socket C, an input terminal 13, an output terminal 14 and a power terminal 15 that are coupled to communication devices of a cellular phone's peripheral equipment, such as wired telephone T2, a hand free device and etc., by means of conduction wires L1, L2, L3 respectively.

Figures 5, 5A:
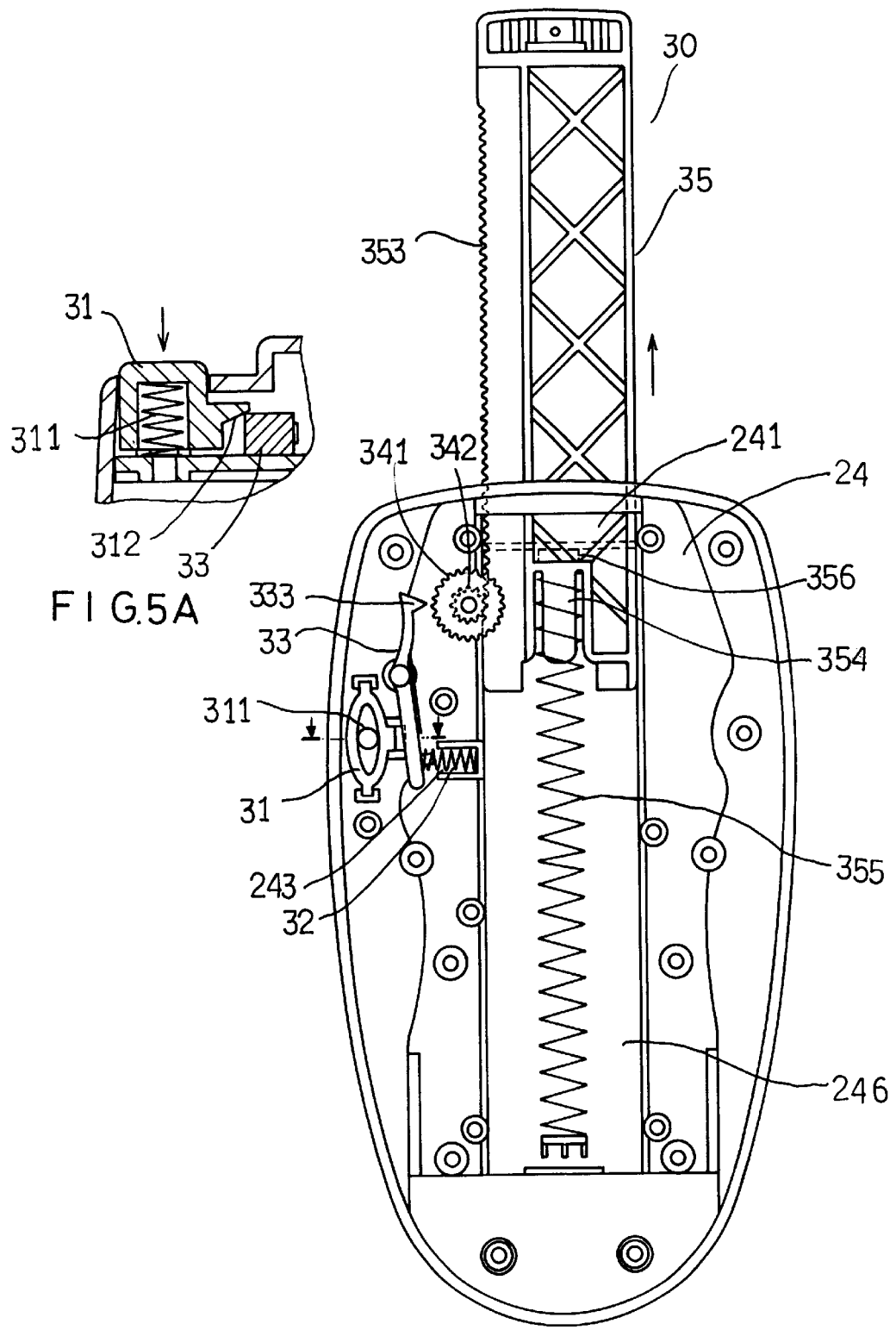
FIG. 5 is a diagram showing the operation mode of the present invention.
FIG. 5A is sectional diagram showing the operation mode of the button in FIG. 5.

The retaining mount 20 has a housing recess 21 for accommodation of a cellular phone T1. In the housing recess 21 are disposed a signal plug 22 power socket 23 for connection to a cellular phone, that are electrically connected to the circuit (not shown) positioned in the base mount 10. At the other half of the retaining mount 20 is defined a platform 24 having an opening 241 at its front lateral side and a through hole 242 at one longitudinal side thereof. A spring receiving room 241 is disposed under the retaining mount 20, an axle hole 244, a positioning axle hole 245 and a slide track 246, as shown in FIG. 5, for accommodation of the parts of the control unit 30. In correspondence to the tubular positioning rods 12 of the base mount 10 are disposed under the retaining mount 20 a plurality of poles 25 that are engaged with the tubular positioning rods 12 by way of screws 121 for locking purpose.

The control unit 30 is made up of a button 31, a spring 32, a link bar 33, a gear set 34, a holding arm 35 and a bottom cover 36.

The button 31 is placed in the through hole 242 of the retaining mount 20 and has a bias spring 311 engaged therewith; and at one side of the button 31 is also provided with an abutment wing 312.

A spring 32 is housed in a receiving cavity 243 of the retaining mount 20. The link bar 33 has a bar embodiment 331 for insertion into the axle hole 244 of the retaining mount 20; and at one end thereof is equipped with a rod protrusion 332 for engagement of the spring 32; and at the opposite end is placed a retaining flange 333.

The gear set 34 engaged with a positioning hole 245 of the retaining mount 20 is made up of an upper gear 341 and a lower gear 342; the former is engaged with the retaining flange 333 of the link bar 33, and the latter is in operational engagement with a rack teeth 353 of the holding arm 35.

The holding arm 35 having an arm embodiment 352 is equipped with a vertical holding board 351 at one end thereof which sticks externally out of the through hole 241 of the retaining mount 20. The line of rack teeth 353 is disposed at one side of the arm embodiment 352 of the holding arm 35. At the other end of the holding arm 35 is disposed a retaining tongue 354 which is associated with a spring element 355. Next to the retaining tongue 354 and on the holding arm is disposed a stop projection 356. The bottom cover 36 is removably secured to the bottom of the retaining mount 20.

Figure 4:
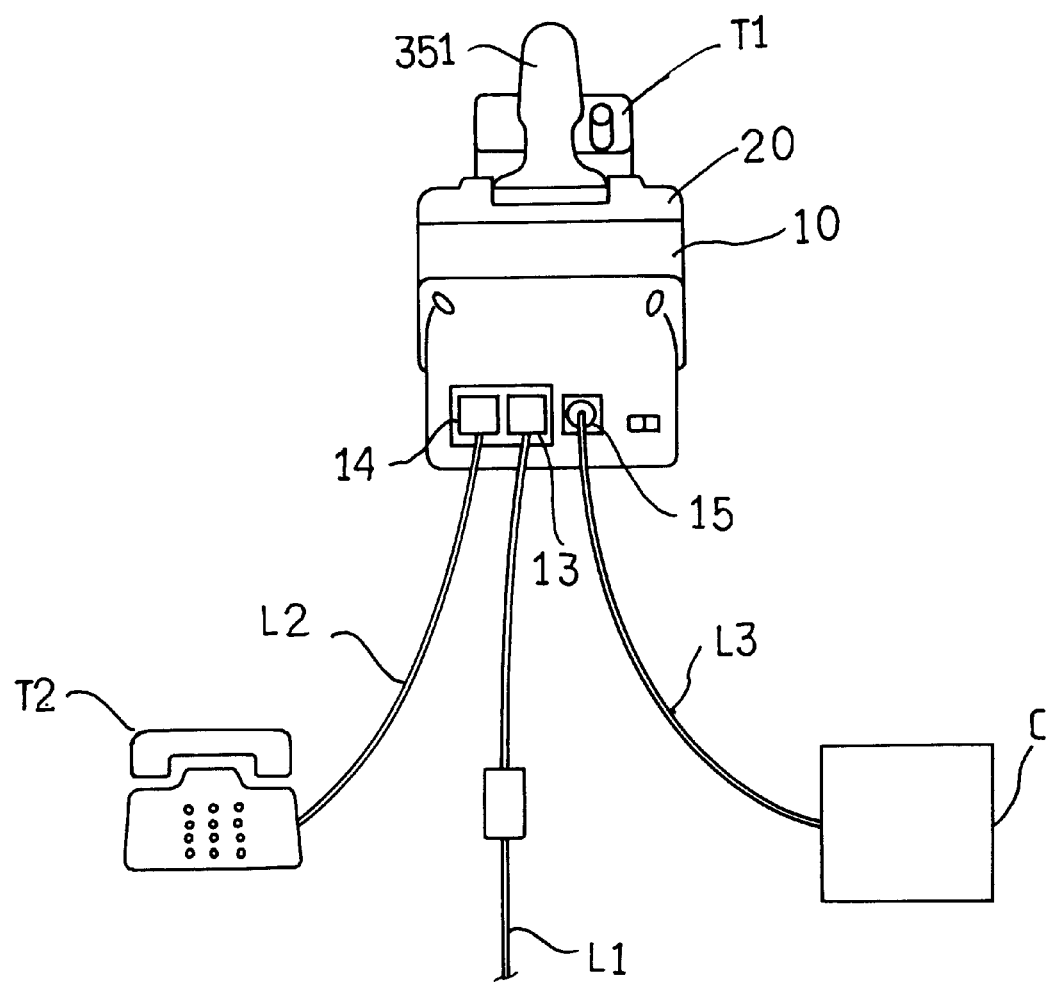
FIG. 4 is a diagram showing the systematic connection of the present invention.

Thereby, a user can place a cellular phone T1 in the housing recess 21 of the retaining mount 20 when he or she stays in an indoor space, an office, or is in a vehicle. In this situation, the signal socket and power socket of the cellular phone T1 are engaged with the signal plug 22 and the power plug 23 of the housing recess 21. In such a manner, incoming calls of the cellular phone T1 can be received via the peripheral equipment of the cellular phone, such as a wired telephone T2, resulting in reduction of direct exposure of a user to electric-magnetic waves of the cellular phone, as shown in FIG. 4.

Figure 6:
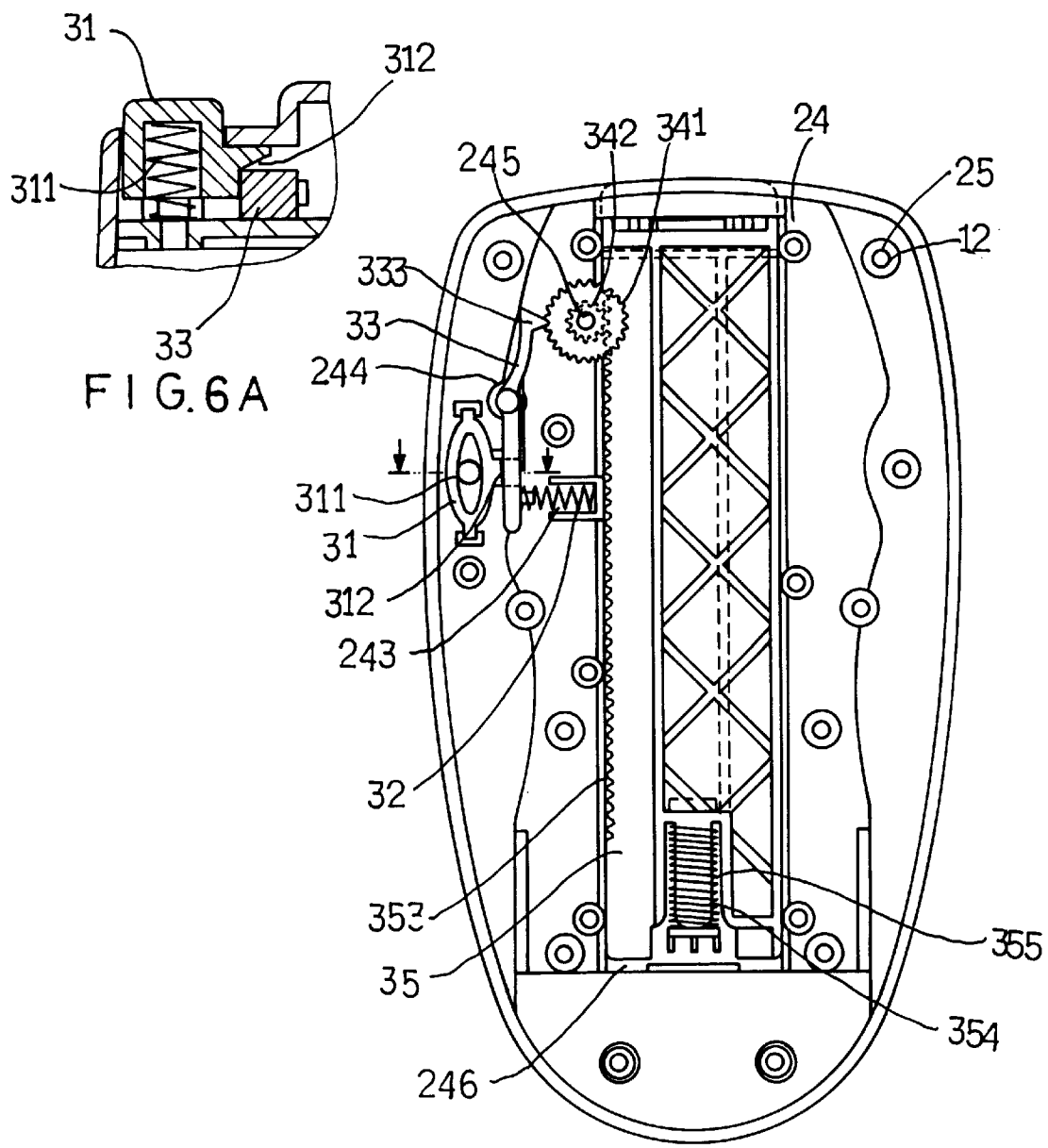
FIG. 6 is a diagram showing another operation mode thereof.

Referring to FIGS. 1–5, as the cellular phone T1 is placed in the housing recess 21, the button 31 is pressed to move downwardly with its abutment wing 312 moving against the link bar 33. Consequently, the retaining flange 333 is urged to withdraw backward out of engagement with the upper gear 341 of the gear set 34. As a result of the exertion of the force of the spring, 355, the holding arm 35 pops out and is limited not to depart from the retaining mount 20 by the stop projection 356. In a reverse manner, as the cellular phone T1 is to be secured in place in the housing recess 21, the holding arm 35 only has to be pushed inwardly, causing the rack teeth 353 of the holding arm 35 to mesh with the lower gear 342 of the gear set 34. Thus the arm embodiment 352 of the holding arm 35 is made to withdraw into the retaining mount 20 to allow a cellular phone T1 to be right fit therein. The spring 355 is in a compressed state, as shown in FIG. 6.

Figure 7:
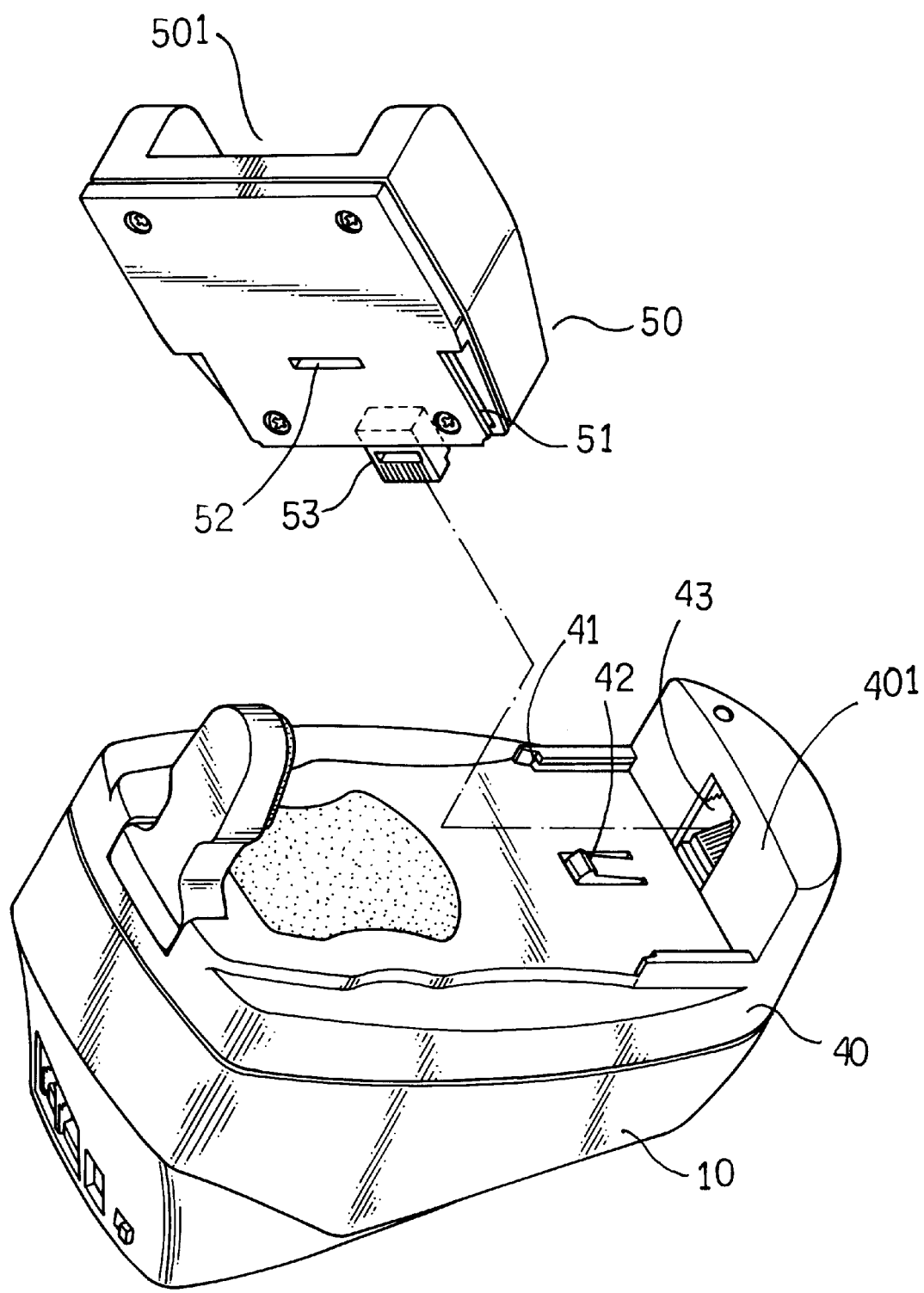
FIG. 7 is a perspective diagram showing the separated parts of a second embodiment.

Referring to FIGS. 7–9, another embodiment of the present invention is illustrated wherein the retaining mount 40 is equipped with a removable seat 50. The retaining mount 40 has a bottom supporting extension 401, which is provided with a vertical groove track 41 at each side thereof. In correspondence to the groove tracks 41 are disposed a pair of retaining projections 51 of the rear sides of the removable seat 50 for locking purpose. A retractable hook 42 is disposed right between the groove tracks 41 for retaining engagement with a slot 52 defined at the rear side of the removable seat 50. At the front side of the seat 50 is disposed a receiving recess 501 and at the bottom of the seat 50 is disposed a connector plug 53 which is in coupling engagement with a modular jack 43 defined on the bottom supporting extension 401 of the retaining mount 40.

The removable seat 50 is designed to selectively match with individual cellular phones of various types produced by different manufacturers. Each cellular phone generally has a signal socket different from others. A user only has to select a proper type of removable seat 50 to match with his or her cellular phone. If a new cellular phone is purchased, only the removable seat 50, not the whole retaining and transmission set, is replaced.

Figure 10:
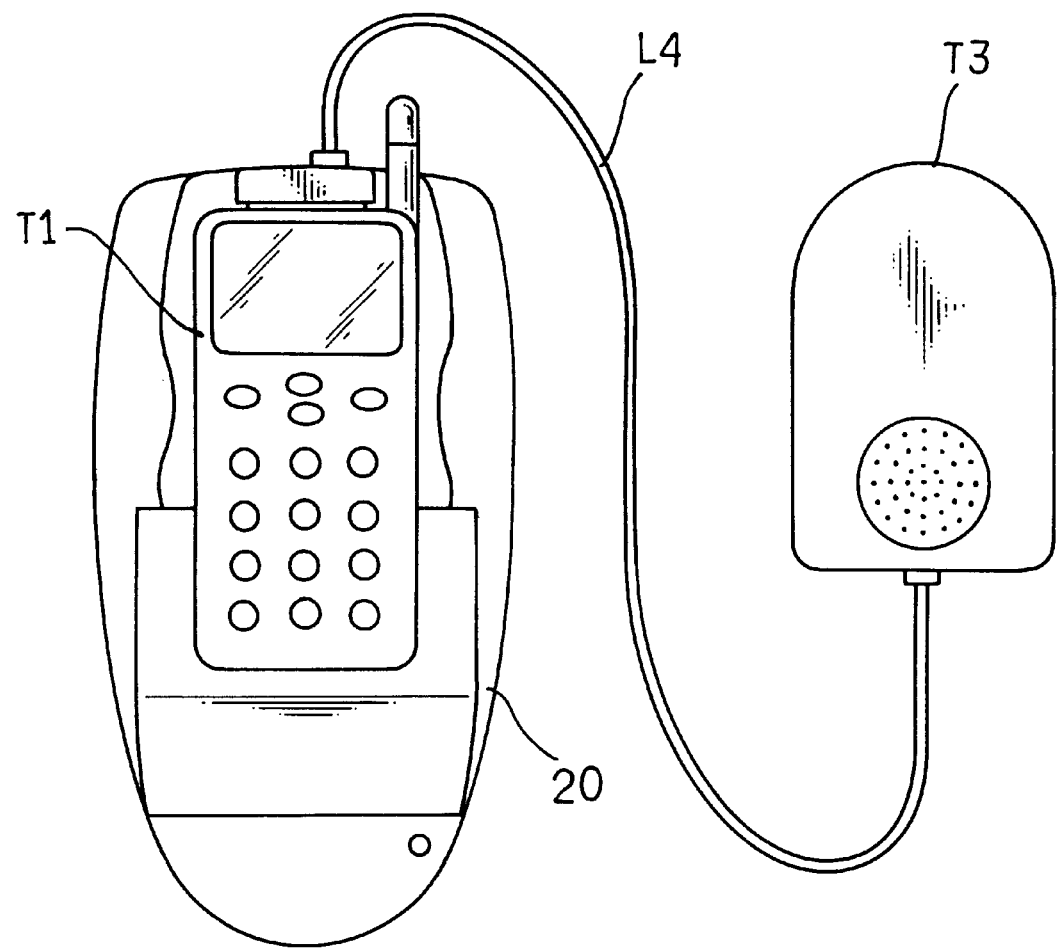
FIG. 10 is a diagram showing the present invention coupled to a hand free device.

Referring to FIG. 10, a hand-free device T3 of a cellular phone's peripheral equipment is in connection to the present invention wherein the retaining mount 20 of the present invention accommodates a cellular phone T1 with a hand-free device T3 connected to the switching and retaining device of the present invention by a conduction wire L4. Thereby incoming calls of a cellular phone can be directly transmitted to a peripheral equipment, such as a hand-free device T3, by way of the switching and retaining device of the present invention.

Figure 11:
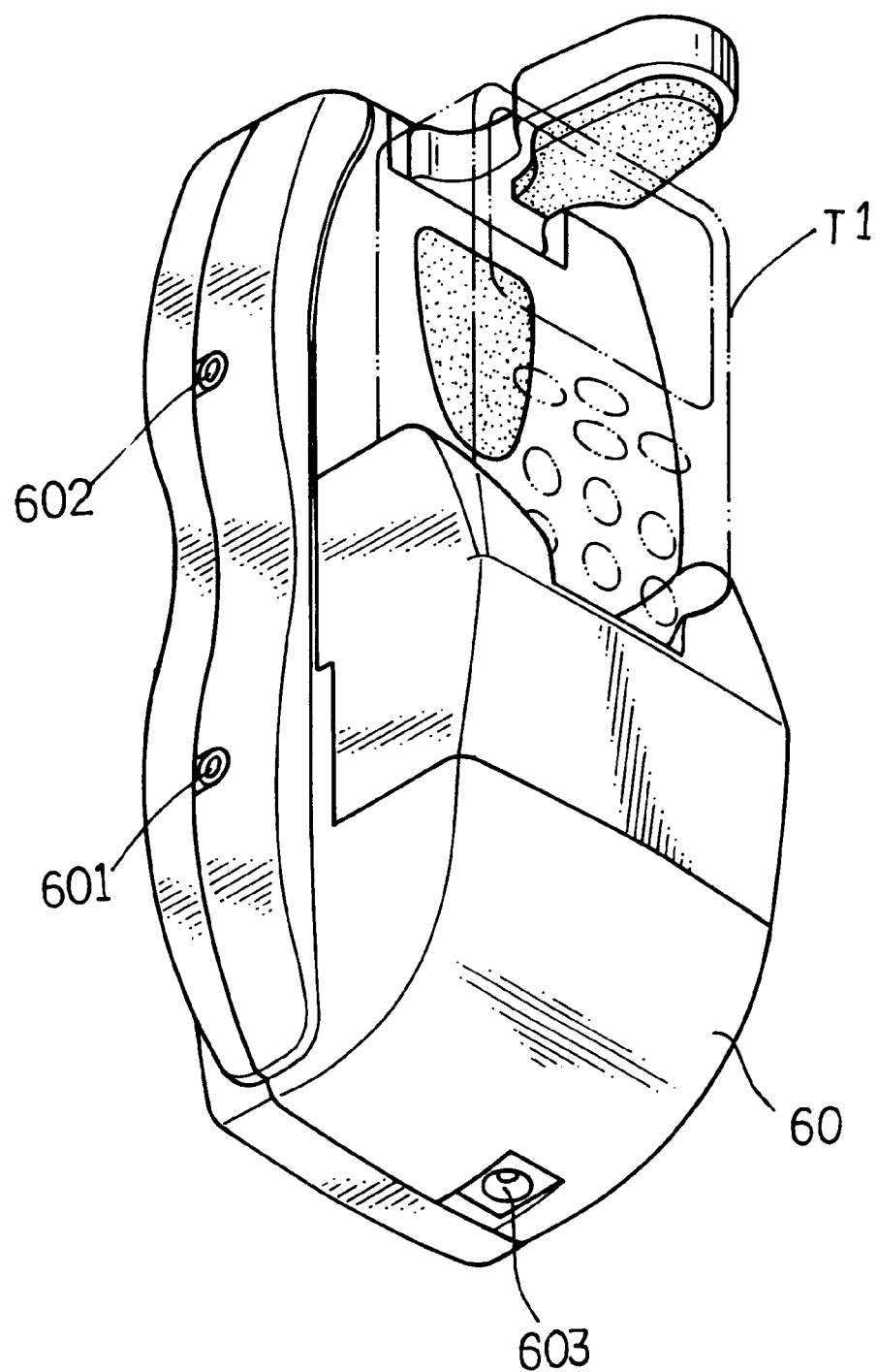
FIG. 11 is a perspective diagram showing the present invention directly served as a hand free device.

Referring to FIG. 11, in this embodiment, the present invention is directly employed as a hand-free device wherein a general circuitry for use in a hand-free device is included in the circuit set of the present invention. In that case, the retaining mount 60 is used as an embodiment of a hand-free device with a earphone socket hole, 601, a microphone socket hole 602 disposed at one side thereof and a power socket 603 at the bottom thereof. Thereby the switching and retaining device of the present invention is converted into a hand-free device for a cellular phone T1.

In summary, the present invention can not only serve as a retaining means for a cellular phone but also permits incoming calls of a cellular phone to be received by a peripheral equipment of the cellular phone by connection of the cellular phone to the peripheral equipment thereof so as to protect people from being harmed and annoyed by electromagnetic wave.

I claim:

1. A switching and retaining device for use in a cellular phone and its peripheral equipment comprising:

a base mount, a retaining mount disposed on top of said base mount, and a holding arm positioned on said retaining mount controlled by a control unit; wherein said base mount is provided with a receiving cavity for housing an electric circuit in which are disposed a plurality of tubular positioning rods; at one side of said base mount are disposed a power socket, an input terminal, an output terminal, and a power terminal that are coupled to communication devices of a cellular phone's peripheral equipment by means of conduction wires L1, L2, L3 respectively;

said retaining mount has a housing recess for accommodation of a cellular phone; in said housing recess are disposed a signal plug, power socket for connection to a cellular phone that are electrically connected to said circuit positioned in said base mount; at the other half of said retaining mount is defined a platform having an opening at a front side and a through hole for accommodation of the parts of said control unit which can control said holding arm to extend or retract for retaining a cellular phone, at a half of said retaining mount is defined a platform having an opening at a front side and a through hole at one side thereof; a spring receiving room is disposed under said retaining mount, an axle hole, a positioning axle hole, and a slide track for accommodation of the parts of said control unit;

whereby a cellular phone can be housed inside said housing recess of said retaining mount and incoming calls can automatically be transmitted to a peripheral equipment of said cellular phone by way of said switching and retaining device.

2. The switching and retaining device for use in a cellular phone and its peripheral equipment as claims in claim 1 wherein said control unit is made up of a button, a spring, a link bar, a gear set, a holding arm, and a bottom cover;

said button is placed in said through hole of said retaining mount and has a bias spring engaged therewith; and one side of said button is also provided with an abutment wing;

a spring is housed in a receiving cavity of said retaining mount;

a link bar has a bar embodiment for the insertion into an axle hole of said retaining mount and one end thereof is equipped with a rod protrusion for engagement of said spring and at an opposite end is also disposed a retaining flange;

a gear set engaged with a positioning hole of said retaining mount is made up of an upper gear and a lower gear; the former is engaged with said retaining flange of said link bar and the latter is in operational engagement with a rack teeth of said holding arm;

said holding arm having an arm embodiment equipped with a vertical holding board at one end thereof which sticks externally out of said through hole of said retaining mount; a line of rack teeth is disposed at one side of said arm embodiment of said holding arm; at the other end of said holding arm is disposed a retaining tongue which is associated with a spring element; next to said retaining tongue and on said holding arm is disposed a stop projection;

a bottom cover is removably secured to the bottom of said retaining mount.

3. The switching and retaining device for use in a cellular phone and its peripheral equipment as claimed in claim 1 wherein said retaining mount is equipped with a removable seat and has a bottom supporting extension which is provided with a vertical groove track at each side thereof; in correspondence to said groove tracks are disposed a pair of retaining projections of the rear sides of said removable seat for locking purpose; a retractable hook is disposed right between said groove tracks for retaining engagement with the a slot defined at the rear side of the removable seat; at the front side of said seat is disposed a receiving recess and at the bottom of said seat is disposed a connector plug which is in coupling engagement with a modular jack defined on said bottom supporting extension of said retaining mount.

4. The switching and retaining device for use in a cellular phone and its peripheral equipment as claimed in claim 1 wherein said switching and retaining device is directly employed as a hand-free device and said retaining mount is used as an embodiment of a hand-free device with an earphone socket hole, a microphone socket hole disposed at one side thereof, and a power socket at the bottom thereof whereby said switching and retaining device converts into a hand-free device for a cellular phone.

* * * * *